United States Patent
Yoshida et al.

(10) Patent No.: US 10,727,775 B2
(45) Date of Patent: Jul. 28, 2020

(54) MOTOR DRIVE DEVICE SUPPRESSING VOLTAGE FLUCTUATION IN DC LINK CAPACITOR

(71) Applicant: FANUC CORPORATION, Yamanashi (JP)

(72) Inventors: Tomokazu Yoshida, Yamanashi (JP); Kiichi Inaba, Yamanashi (JP); Shigeki Hanyuu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/479,469

(22) Filed: Apr. 5, 2017

(65) Prior Publication Data
US 2017/0302213 A1 Oct. 19, 2017

(30) Foreign Application Priority Data
Apr. 14, 2016 (JP) ................. 2016-080871

(51) Int. Cl.
| | | |
|---|---|---|
| H02P 27/08 | (2006.01) | |
| H02M 5/458 | (2006.01) | |
| H02M 1/14 | (2006.01) | |
| H02P 6/14 | (2016.01) | |

(52) U.S. Cl.
CPC ............ *H02P 27/08* (2013.01); *H02M 1/14* (2013.01); *H02M 5/458* (2013.01); *H02M 5/4585* (2013.01); *H02P 6/14* (2013.01)

(58) Field of Classification Search
CPC ............ H02P 27/08; H02P 6/14; H02M 5/458
USPC ........................................................ 318/479
See application file for complete search history.

(56) References Cited

U.S. PATENT DOCUMENTS

| | | | | |
|---|---|---|---|---|
| 10,439,402 | B2* | 10/2019 | Boehmer | H02M 1/44 |
| 2010/0131083 | A1* | 5/2010 | Leany | H02P 23/0077 |
| | | | | 700/83 |
| 2011/0029137 | A1* | 2/2011 | Yasohara | H02P 5/00 |
| | | | | 700/275 |
| 2013/0099705 | A1* | 4/2013 | Iwashita | H02M 5/458 |
| | | | | 318/400.22 |
| 2016/0368483 | A1* | 12/2016 | Nawata | B60W 10/08 |
| 2017/0149369 | A1* | 5/2017 | Watabu | H02J 7/007 |

(Continued)

FOREIGN PATENT DOCUMENTS

| | | |
|---|---|---|
| JP | 2007-325377 | 12/2007 |
| JP | 2013-93957 | 5/2013 |
| JP | 2014-176252 | 9/2014 |

(Continued)

*Primary Examiner* — Jorge L Carrasquillo
*Assistant Examiner* — Devon A Joseph
(74) *Attorney, Agent, or Firm* — Wenderoth, Lind & Ponack, L.L.P.

(57) ABSTRACT

To provide a motor drive device that suppresses voltage fluctuation of a DC link capacitor, as well as enabling for low cost and size reduction. A motor control unit sets a threshold of voltage at which to start regeneration to a first threshold in a case of an increased amount per unit time of a DC voltage value detected by a voltage detection part being less than a certain amount, and sets the threshold of voltage at which to start regeneration to a second threshold that is larger than the first threshold, in a case of the increased amount per unit time of the DC voltage value detected by the voltage detection part being at least a certain amount.

4 Claims, 5 Drawing Sheets

(56) References Cited

U.S. PATENT DOCUMENTS

2017/0279364 A1* 9/2017 Yuzurihara ....... H02M 3/33569
2018/0226803 A1* 8/2018 Maki ......................... G05F 1/67

FOREIGN PATENT DOCUMENTS

WO          2015/050068        4/2015
WO    WO-2015194013 A1 * 12/2015  ............. H02P 27/06

* cited by examiner

MOTOR DRIVE DEVICE SUPPRESSING VOLTAGE FLUCTUATION IN DC LINK CAPACITOR

This application is based on and claims the benefit of priority from Japanese Patent Application No. 2016-080871, filed on 14 Apr. 2016, the content of which is incorporated herein by reference.

BACKGROUND OF THE INVENTION

Field of the Invention

The present invention relates to a motor drive device that suppresses voltage fluctuation in a DC link capacitor.

Related Art

Conventionally, the motor drive device that controls a motor such as a servomotor includes a DC link capacitor between a converter and an inverter. In such a motor drive device, technology has been known for suppressing voltage fluctuation of the DC link capacitor (for example, refer to Patent Documents 1 and 2).

For example, the motor drive device described in Patent Document 1 includes voltage to ground capacitors C100 at an input portion of the converter of a motor drive device 100, as shown in FIG. 7, for suppressing voltage fluctuation of the DC link capacitor. In addition, the technology for suppressing voltage fluctuation of the DC link capacitor by connecting a DC/DC power source, resistor 110, etc. to both ends of the DC link capacitor has also been known, as shown in FIG. 7.

Furthermore, the motor drive device described in Patent Document 2, in the case of the voltage of the DC link capacitor rising, increases the consumption energy of the motor by flowing reactive current to the motor to suppress voltage fluctuation of the DC link capacitor.

Patent Document 1: Japanese Unexamined Patent Application, Publication No. 2007-325377

Patent Document 2: Japanese Unexamined Patent Application, Publication No. 2013-093957

SUMMARY OF THE INVENTION

However, in the case of adding components such as the voltage to ground capacitors, DC/DC power source and resistor to a motor drive device as in Patent Document 1, etc., the production cost increases, and a size reduction in the motor drive device has been difficult.

In addition, in the case of increasing the consumption energy of the motor as in Patent Document 2, since the thermal loss of the motor becomes greater, it is necessary to provide a device for cooling the motor accompanying the increase in thermal loss of the motor. For this reason, the production cost increases, and the size reduction in the motor drive device has been difficult also for a motor drive device such as in Patent Document 2.

Therefore, the present invention has an object of providing a motor drive device that suppresses voltage fluctuation in the DC link capacitor, as well as enabling for low cost and a size reduction.

A motor control device according to the present invention (for example, the motor control device 1 described later) includes: a converter (for example, the converter 11 described later) that converts AC electric power from a power source into DC electric power; a voltage detection unit (for example, the voltage detection unit 13 described later) that detects a DC voltage value of the DC link capacitor (for example, the DC link capacitor C1 described later); an inverter (for example, the inverter 12 described later) that is connected to the DC link capacitor, converts the DC electric power into drive electric power of a motor (for example, the motor 3 described later), and converts the DC electric power into three-phase AC electric power in a case of the DC voltage value detected by the voltage detection unit reaching a threshold at which to start regeneration of the motor; and a motor control unit (for example, the motor control unit 14 described later) that sets the threshold to a first threshold in a case of an increased amount per unit time of the DC voltage value being less than a certain amount, and sets the threshold to a second threshold that is larger than the first threshold, in a case of the increased amount per unit time of the DC voltage value being at least a certain amount.

The motor control unit may determine that the increased amount per unit time of the DC voltage value is less than the certain amount, in a case of the increased amount per unit time of the DC voltage value being smaller than an increased amount per unit time of DC voltage value during deceleration of the motor, and set the threshold to a first threshold.

The motor control unit, in a state in which the threshold is set to the first threshold, may determine that the increased amount per unit time of the DC voltage value is at least the certain amount, in a case of the increased amount per unit time of the DC voltage value exceeding a maximum allowed value of the motor drive device, and set the threshold to a second threshold.

The first threshold, the second threshold and the maximum allowed value of the motor drive device may be rewritable by external equipment.

According to the present invention, it is possible to provide a motor drive device that suppresses voltage fluctuation in the DC link capacitor, as well as enabling for low cost and a size reduction.

DETAILED DESCRIPTION OF THE INVENTION

Figure 1:
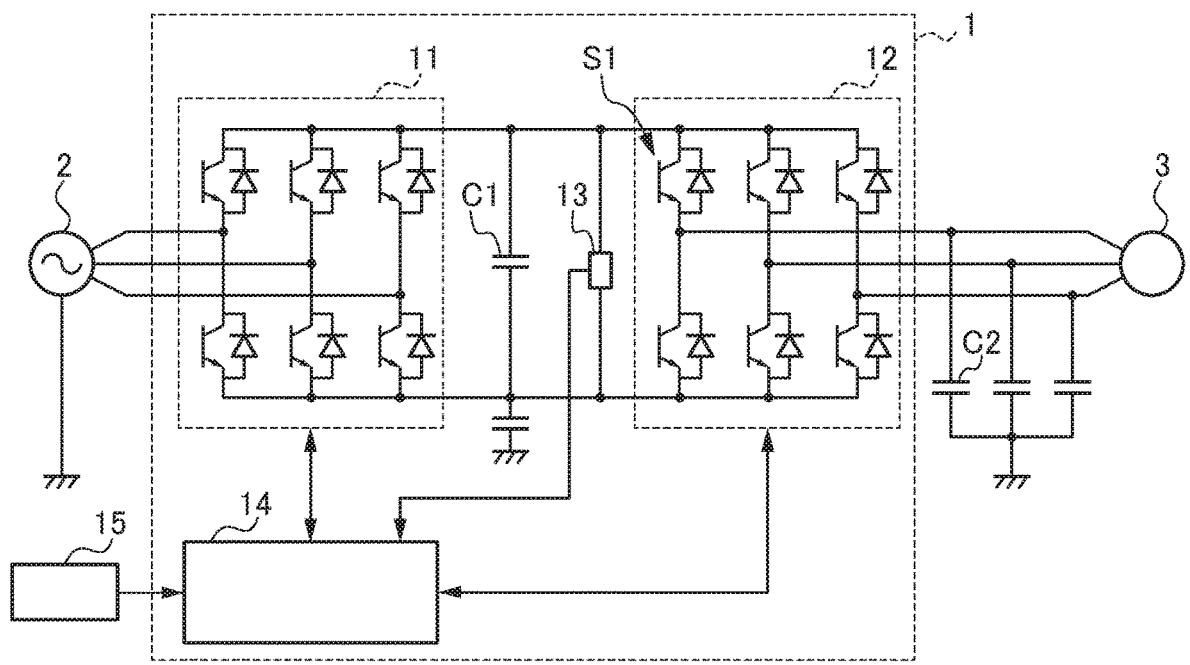
FIG. 1 is a view showing a circuit configuration of a motor drive device according to an embodiment of the present invention.

Hereinafter, an example of an embodiment of the present invention will be explained. FIG. 1 is a view showing a circuit configuration of a motor drive device 1 according to the embodiment of the present invention. The motor drive device 1 is connected with a commercial three-phase AC power source 2 and motor 3, and drives and controls the motor 3 using the electric power from the AC power source 2. It should be noted that the AC power source 2 is not limited to three-phase alternating current, and may be single-phase alternating current, for example.

The motor drive device 1 includes a converter 11, inverter 12, DC link capacitor C1, voltage detection unit 13, and motor control unit 14.

The converter 11 converts the AC electric power inputted from the AC power source 2 into DC electric power. The converter 11, for example, is configured by a diode rectification converter or PWM converter having a power semiconductor element and a bridge circuit of a diode connected reversely parallel to the power semiconductor element. The converter 11 full-wave rectifies the AC electric power from the three-phase AC power source to convert to DC electric power by way of the diode, when supplying electric power to the motor 3.

The inverter 12 converts the DC electric power into AC electric power for driving of the motor 3. In addition, the inverter 12 converts the AC electric power regenerated from the motor 3 into DC electric power.

The inverter 12, for example, is configured from power semiconductor elements and a bridge circuit connected reversely parallel thereto. Then, by ON-OFF controlling (e.g., PWM control) these power semiconductor elements according to the commands from the motor control unit 14, the DC electric power is converted into AC electric power of a desired waveform and frequency. The inverter 12 supplies the outputted AC current to the motor 3.

The switching operation of the inverter 12 is controlled by the motor control unit 14. In other words, the motor control unit 14 creates a command for the motor 3 to operate at a desired speed (accelerate, decelerate, constant speed, stop, etc.), torque or rotor position.

Then, based on this command, the motor control unit 14 outputs ON-OFF commands to the power semiconductor elements of the inverter 12, so that the inverter 12 outputs AC current having the waveform and frequency required in order for the motor 3 to operate. The AC current outputted by the inverter 12 is inputted to the motor 3, whereby the motor 3 performs a rotation operation.

The DC link capacitor C1 connects the DC side of the converter 11 with the DC side of the inverter 12, and performs transfer of DC electric power. The DC link capacitor C1 smooths the DC voltage converted by the converter 11 or inverter 12.

The voltage detection unit 13 detects the DC voltage value of the DC link capacitor C1. The voltage detection unit 13 sends the detected DC voltage value to the motor control unit 14. As the voltage detection unit 13, it is possible to use an existing voltage detection circuit, for example.

The motor control unit 14 is connected with the converter 11, the inverter 12 and the voltage detection unit 13, and performs predetermined controls. The motor control unit 14 is configured by an arithmetic processor such as a DSP (Digital Signal Processor), or FPGA (field-Programmable Gate Array), for example. Operation of the motor control unit 14 is realized by executing predetermined software (program). In addition, the motor control unit 14 is connected, for example, with external equipment 15 including a computer, etc.

Figure 2:
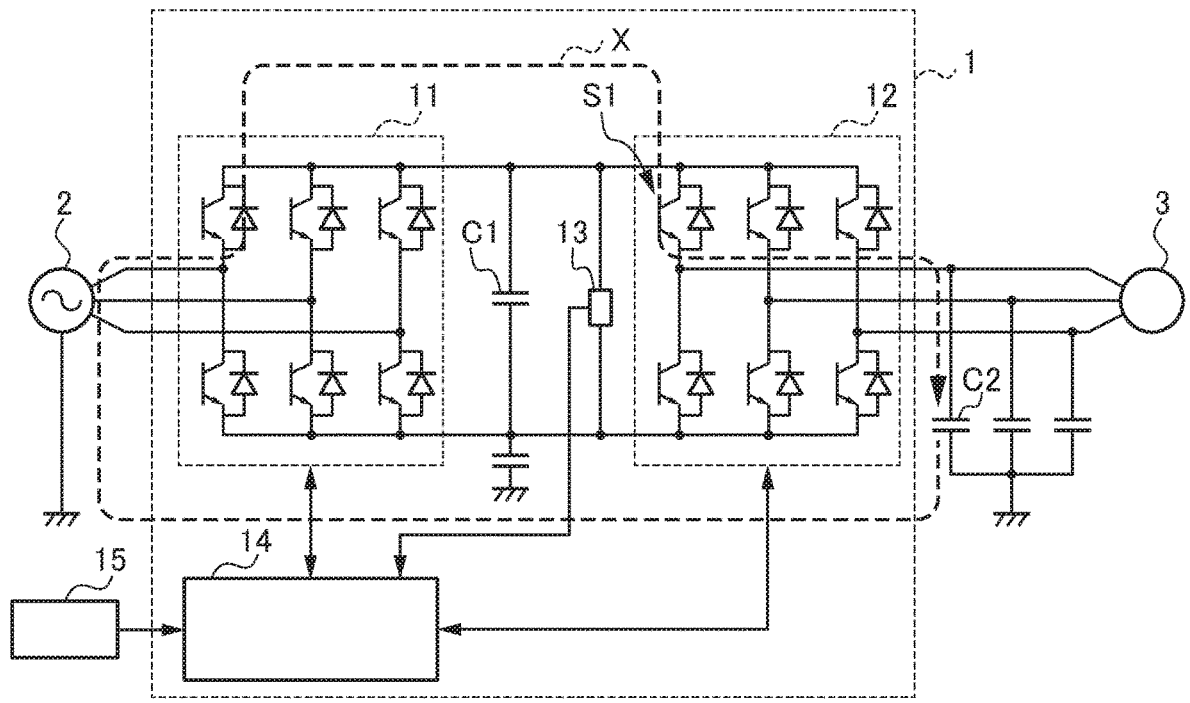
FIG. 2 is a view showing the flow of current during regeneration operation of the motor drive device according to the embodiment of the present invention.
Figure 3:
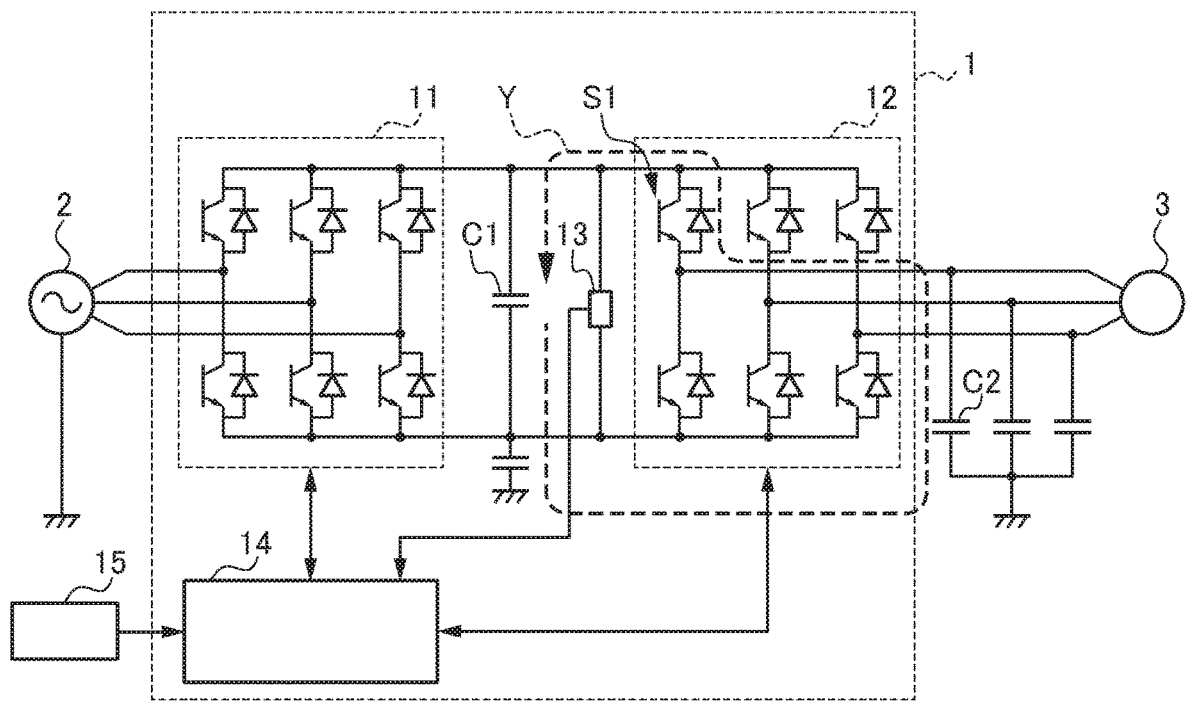
FIG. 3 is a view showing the flow of current during regeneration operation of the motor drive device according to the embodiment of the present invention.
Figure 4:
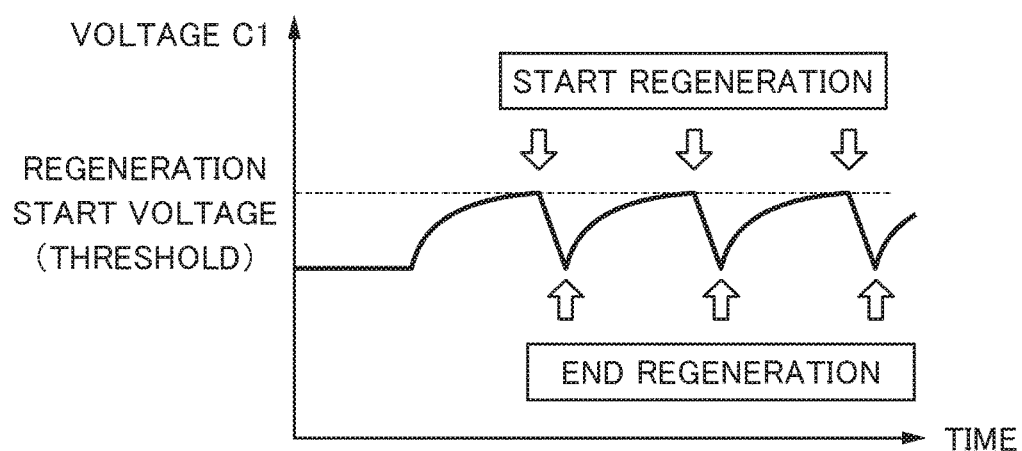
FIG. 4 is a graph showing voltage fluctuation of a DC link capacitor.

Next, the voltage fluctuation of the DC link capacitor C1 of the motor drive device 1 according to the embodiment of the present invention will be explained. FIGS. 2 and 3 are views showing the flow of current during regeneration operation of the motor drive device 1 according to the embodiment of the present invention. FIG. 4 is a view showing voltage fluctuation of the DC link capacitor C1.

When the motor 3 is stopped and is in a state only of excitation, if the power semiconductor element S1 of the inverter 12 is turned ON, the charging current will flow in the pathway of route X from the AC power source 2 to the floating capacitance C2, and the charge is stored in the floating capacitance C2, as shown in FIG. 2.

Next, when the power semiconductor element S1 is turned OFF, as shown in FIG. 3, the charge stored in the floating capacitance C2 is flowed into the pathway of route Y to the DC link capacitor C1, and the voltage of the DC link capacitor C1 increases.

The voltage of the DC link capacitor C1 increases according to ON/OFF of the power semiconductor element S1. Then, when reaching the voltage (threshold) at which the voltage of the DC link capacitor C1 starts regeneration as shown in FIG. 4, regeneration is started. However, the voltage increase of the DC link capacitor C1 is not a voltage increase by the regeneration electric power generating during deceleration of the motor 3; therefore, the voltage increase of the DC link capacitor C1 is instantly eliminated and regeneration also ends.

By repeating the charge/discharge of the charge of the floating capacitance C2 and the start/end of regeneration in this way, since the voltage increase of the DC link capacitor C1 and the elimination of the voltage increase are repeated, the voltage fluctuation of the DC link capacitor C1 becomes larger.

Figure 5:
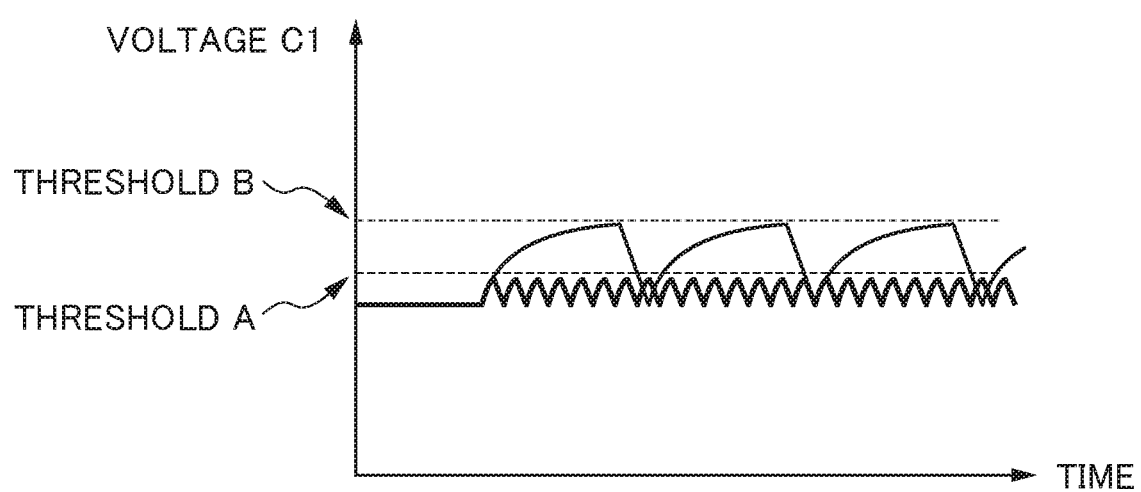
FIG. 5 is a graph showing voltage fluctuation of the DC link capacitor of the motor drive device according to the embodiment of the present invention.

Therefore, in order to suppress the voltage fluctuation of the DC link capacitor C1, the motor drive device 1 according to the embodiment of the present invention performs control such as below. FIG. 5 is a graph showing the voltage fluctuation of the DC link capacitor C1 of the motor drive device 1 according to the embodiment of the present invention.

As shown in FIG. 5, the motor control device 14 sets the threshold for the voltage to start regeneration to a first threshold A, in a case of the increased amount per unit time of the DC voltage value detected by the voltage detection unit 13 being less than a certain amount. In addition, the motor control unit 14 sets the threshold for the voltage at which to start regeneration to a second threshold B which is larger than the first threshold A, in the case of the increased amount per unit time of the DC voltage value detected by the voltage detection unit 13 being at least a certain amount.

The motor control unit 14 curbs a drastic rising in the voltage of the DC link capacitor C1, by performing regeneration also in the case of the increased amount per unit time of the voltage of the DC link capacitor C1 being small (first threshold A) in this way. The motor drive device 1 can thereby curb the voltage fluctuation of the DC link capacitor C1 occurring by repetition of charge-discharge of the charge of the floating capacitance C2 and the start/end of regeneration.

More specifically, the motor control unit 14 determines that the increased amount per unit time of the DC voltage value is less than a certain amount in a case of the increased amount per unit time of the DC voltage value being smaller than the increased amount per unit time of the DC voltage amount during deceleration of the motor 3, and sets the threshold for the voltage at which to start regeneration to the first threshold A.

In addition, the motor control unit 14 may determine whether or not the increased amount per unit time of the DC voltage value is less than a certain amount, by obtaining the slope of voltage fluctuation of the DC link capacitor C1.

In a state in which the threshold is set to the first threshold A, the motor control unit 14 determines that the increase amount per unit time of the DC voltage value is at least a certain amount, in a case of the increased amount per unit time of the DC voltage value exceeding a maximum allowed value of the motor drive device 1, and sets the threshold to the second threshold B.

The first threshold A, second threshold B and maximum allowed value of the motor drive device 1 are preferably rewritable by the external equipment 15 connected to the motor control unit 14.

Figure 6:
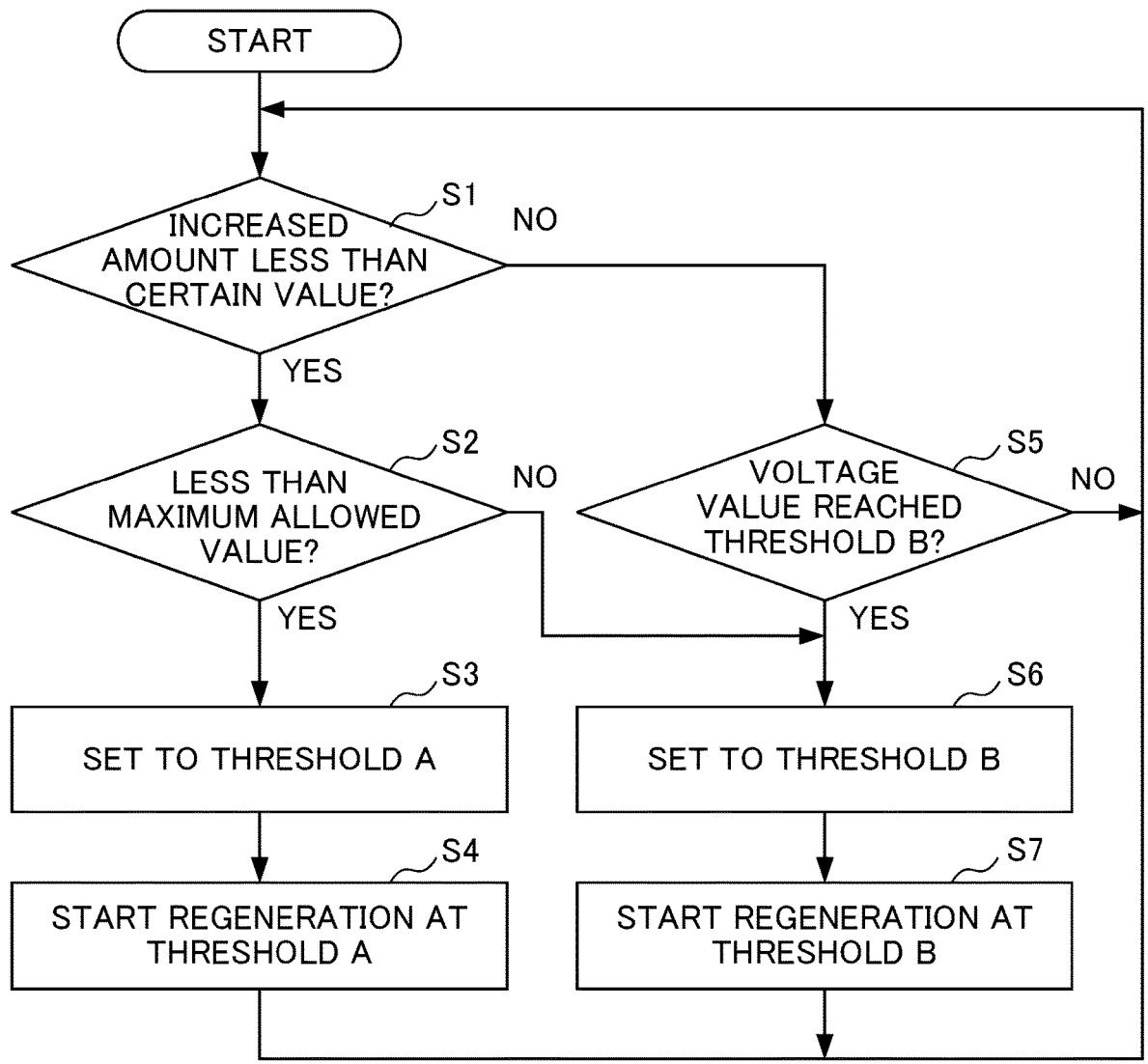
FIG. 6 is a flowchart showing the flow of processing of the motor drive device according to the embodiment of the present invention.
Figure 7:
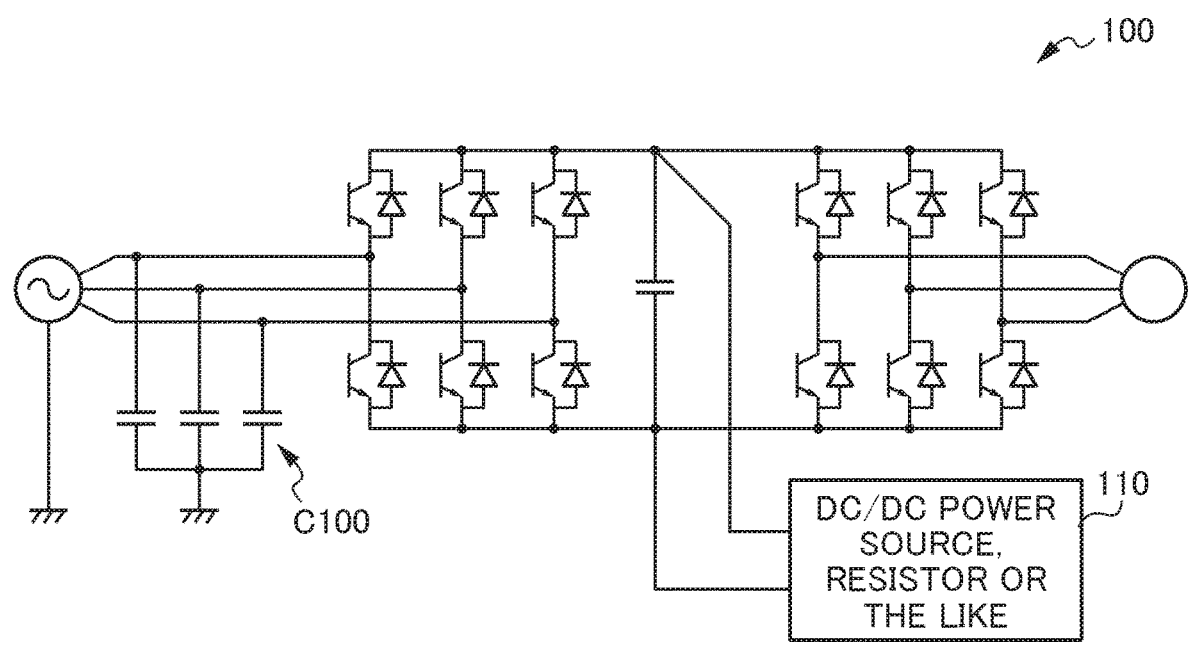
FIG. 7 is a view showing the circuit configuration of a conventional motor drive device.

FIG. 6 is flowchart showing the flow of processing of the motor drive device 1 according to the embodiment of the present invention. It should be noted that the motor control unit 14 starts the processing in a state setting the threshold for the voltage at which to start regeneration to the first threshold A or the second threshold B.

In Step S1, the motor control unit 14 determines whether or not the increased amount per unit time of the DC voltage value detected by the voltage detection amount 13 is less than the certain amount, by determining whether or not the increased amount per unit time of the DC voltage value is smaller than the increased amount per unit time of the DC voltage value during deceleration of the motor 3. In the case of the increased amount per unit time of the DC voltage value being less than the certain amount (YES), the processing advances to Step S2. In the case of the increased amount per unit time of the DC voltage value being at least the certain amount (NO), the processing advances to Step S5.

In Step S2, the motor control unit 14 determines whether or not the increased amount per unit time of the DC voltage value is less than the maximum allowed value for the motor drive device 1. In the case of the increased amount per unit time of the DC voltage value being less than the maximum allowed value for the motor drive device 1 (YES), the processing advances to Step S3. In the case of the increase amount per unit time of the DC voltage value exceeding the maximum allowed value of the motor drive device 1 (NO), the processing advances to Step S6.

In Step S3, the motor control unit 14 sets the threshold for the voltage at which to start regeneration to the first threshold A. In Step S4, the motor control unit 14 starts regeneration at the first threshold A, and subsequently, the processing returns to Step S1.

In Step S5, the motor control unit 14 determines whether the voltage value of the DC link capacitor C1, i.e. DC voltage value detected by the voltage detection unit 13, has reached the second threshold B. In the case of the DC voltage value having reached the second threshold B (YES), the processing advances to Step S6. In the case of the DC voltage value not having reached the second threshold B (NO), the processing returns to Step S1.

In Step S6, the motor control unit 14 sets the threshold for the voltage at which to start regeneration to the second threshold B. In Step S7, the motor control unit 14 starts regeneration at the second threshold B, and subsequently, the processing returns to Step S1.

According to the present embodiment, the motor drive device 1 sets the threshold for the voltage at which to start regeneration to the first threshold A or second threshold B, in response to the increased amount per unit time of the DC voltage value detected by the voltage detection unit 13. By performing regeneration also in the case of the increased amount per unit time of the voltage of the link capacitor C1 being small (first threshold A), it is possible to curb the drastic rise in voltage of the DC link capacitor C1. The motor drive device 1 can thereby curb the voltage fluctuation of the DC link capacitor C1 produced by charge-discharge of the charge of the floating capacitance C2 and start/end of regeneration.

In addition, the motor drive device 1 curbs the voltage fluctuation of the DC link capacitor C1 according to the setting of the threshold; therefore, for example, it is not necessary to provide a device or the like for cooling the motor accompanying the increase in thermal loss of the motor. Therefore, the motor drive device 1 curbs the voltage fluctuation of the DC link capacitor C1, and enables a decrease in production cost and a size reduction.

In addition, the motor drive device 1 sets the threshold to the first threshold A in the case of the increased amount per unit time of the DC voltage value being smaller than the increased amount per unit time of the DC voltage value during deceleration of the motor 3. In this way, the motor drive device 1 can appropriately set the threshold according to the state of the motor 3, by judging the increased amount per unit time of the DC voltage value with the increase amount per unit time of the DC voltage value during deceleration of the motor 3.

In addition, the motor drive device 1 sets the threshold to the second threshold B which is greater than the first threshold A, in a case of the increased amount per unit time of the DC voltage value exceeding a maximum allowed value of the motor drive device 1. The motor drive device 1 can thereby appropriately set the threshold according to the state of the DC link capacitor C1 to perform the appropriate regeneration.

In addition, in the motor drive device 1, the first threshold A, second threshold B and maximum allowed value of the motor drive device 1 are rewritable by external equipment 15 connected to the motor control unit 14; therefore, the motor drive device 1 can change the first threshold, second threshold and maximum allowed value to appropriate values, even if after setting values temporarily.

Although an embodiment of the present invention has been explained above, the present invention is not to be limited to the aforementioned embodiment. In addition, the effects described in the present embodiment are merely listing the most preferred effects produced from the present invention, and the effects according to the present invention are not to be limited to those described in the present embodiment.

For example, in the aforementioned embodiment, there is only one motor 3; however, a plurality of the motors 3 may be provided. In the case of a plurality of the motors 3 being present, the motor control unit 14 may determine a state of all of the motors 3 stopping as the motor 3 being stopped, for example. The motor control unit 14 may determine from the rotation command or speed command to the motor 3 as the state in which the motor 3 stopped, or may determine according to an event of the current of the motor 3 becoming 0.

EXPLANATION OF REFERENCE NUMERALS 1 motor drive device
2 AC power source
3 motor
11 converter
12 inverter
13 voltage detection unit
14 motor control unit 15 external equipment
C1 DC link capacitor
C2 floating capacitance

What is claimed is:

1. A motor drive unit comprising:
a converter that converts AC electric power from a power source into DC electric power;
a DC link capacitor connected to the converter;
a voltage detector that detects a DC voltage value of the DC link capacitor;
an inverter connected to the DC link capacitor, that converts the DC electric power into drive electric power of a motor; and
a motor control unit that is connected with the converter, the inverter, and the voltage detector, and performs predetermined controls,
wherein the motor control unit: (i) obtains the slope of voltage fluctuation of the DC link capacitor C1 to determine an amount of increase per unit time of the DC voltage value of the DC link capacitor, (ii) in a case that the amount of increase per unit time of the DC voltage value is less than a certain amount and less than a maximum allowed value, sets a regeneration start threshold to a first threshold, (iii) in a case that the amount of increase per unit time of the DC voltage value is greater than or equal to the certain amount and the DC voltage value has reached a second threshold, sets the regeneration start threshold to the second threshold, and (iv) in a case that the amount of increase per unit time of the DC voltage value is less than a certain amount and exceeds the maximum allowed value, sets the regeneration start threshold to the second threshold,
wherein the first threshold is less than the second threshold,
wherein the converter converts the DC electric power into three-phase AC electric power in a case of the DC voltage value detected by the voltage detector reaches the regeneration start threshold set by the motor control unit.

2. The motor drive device according to claim 1, wherein the motor control unit determines that the amount of increase per unit time of the DC voltage value is less than the certain amount in a case that the amount of increase per unit time of the DC voltage value is smaller than an amount of increase per unit time of DC voltage value during deceleration of the motor.

3. The motor drive device according to claim 1, wherein the motor control unit determines that the amount of increase per unit time of the DC voltage value is at least the certain amount in a case that the amount of increase per unit time of the DC voltage value exceeds a maximum allowed value of the motor drive device.

4. The motor drive device according to claim 3, wherein the maximum allowed value of the motor drive device is rewritable by external equipment.

* * * * *